United States Patent [19] [11] 4,348,246
Nakanishi [45] Sep. 7, 1982

[54] METHOD OF PRINTING

[75] Inventor: Motoyasu Nakanishi, Shimizu, Japan

[73] Assignees: Suzuki Sogyo Kabushiki Kaisha; Kabushiki Kaisha Cubic Engineering, both of Shizuokaken, Japan

[21] Appl. No.: 222,882

[22] Filed: Jan. 6, 1981

[51] Int. Cl.³ .......................... B29C 3/00; B32B 31/04; B32B 31/20

[52] U.S. Cl. .................................. 156/73.1; 156/73.6; 156/83; 156/212; 156/230; 156/236; 156/238; 156/277; 156/308.2; 156/387; 156/540; 156/581

[58] Field of Search ..................... 156/73.1, 73.6, 212, 156/230, 236, 238, 241, 277, 583.1, 540–542, 581, 83, 583.91, 387, 308.2

[56] References Cited

U.S. PATENT DOCUMENTS

| | | | |
|---|---|---|---|
| 3,025,208 | 3/1962 | Geiger | 156/581 |
| 3,746,589 | 7/1973 | Reinke | 156/73.1 |
| 4,010,057 | 3/1977 | Nakanishi | 156/230 |
| 4,229,239 | 10/1980 | Arai et al. | 156/230 |

*Primary Examiner*—Michael G. Wityshyn
*Attorney, Agent, or Firm*—Wenderoth, Lind & Ponack

[57] ABSTRACT

A method of printing wherein a material to be printed is applied onto a pattern which is preprinted on an extendible film which is extended on an accumulated granule layer composed of a number of spherical granules so that the preprinted pattern at its whole surface is adhered to the surface of the material to be printed by forcing the material to be printed into the accumulated granule layer.

16 Claims, 11 Drawing Figures

METHOD OF PRINTING

BACKGROUND OF THE INVENTION

The present invention relates to a method of printing on a curved surface of a extendible film.

This kind of conventional printing method, as described in the specification of the U.S. Pat. No. 4,010,057, depends on a technique by which an inflatable film on which a transcription pattern is printed in advance is kept afloat on water, to be expanded and impressed by a material to be printed to be immersed into water, and the film is adhered to the material to be printed by virtue of water pressure while the film is extended.

However, the conventional method is disadvantageous in that it is difficult to supply the film since it should be kept stationary on the water surface, a favorable print cannot be obtained if the timing of impression of the material to be printed is delayed since the film begins to extend and expand as soon as it contacts water, it is troublesome to impress the material to be printed against the film, and the printing of the pattern on the specified position of the material to be printed is difficult.

SUMMARY OF THE INVENTION

The present invention provides a method of printing wherein a transcription film made of an extendible film is placed on an accumulated granule, layer composed of a number of fine granules a transcription pattern is preprinted on the transcription film to form a transcription surface and the opposite surface of the film is made to contact the accumulated granule layer, the material to be printed contacts the transcription surface, the material to be printed is impressed into the accumulated granule layer, and vibration is applied to at least one of the accumulated granule layer and the material to be printed during impression of the material to be printed into the accumulated granule layer.

Furthermore, the present invention provides a method of printing to cover the material to be printed with the extendible film made of a thermally fusible material.

According to this method, the film need not be removed since at least one of the material to be printed and the accumulated granule layer is heated to make a covering film adhere to the material to be printed by utilizing the heat generated.

The present invention also provides a method of printing in which a covering film is adhered to the material to be printed with an adhesive layer interposed between them.

This method is advantageous in that the transparency of the covering film is not impaired if a transparent film is used since the covering film can be adhered to the material to be printed without fusing the covering film.

Moreover, the present invention provides a method of printing adopted to uniformly distribute the pressure of the accumulated granule layer applied to the transcription film or the covering film through a sheet layer made of a plastically deformable material such as, for example, silicon rubber interposed between the transcription film or the covering film and the accumulated granule layer.

DETAILED DESCRIPTION OF THE INVENTION

Figure 1:
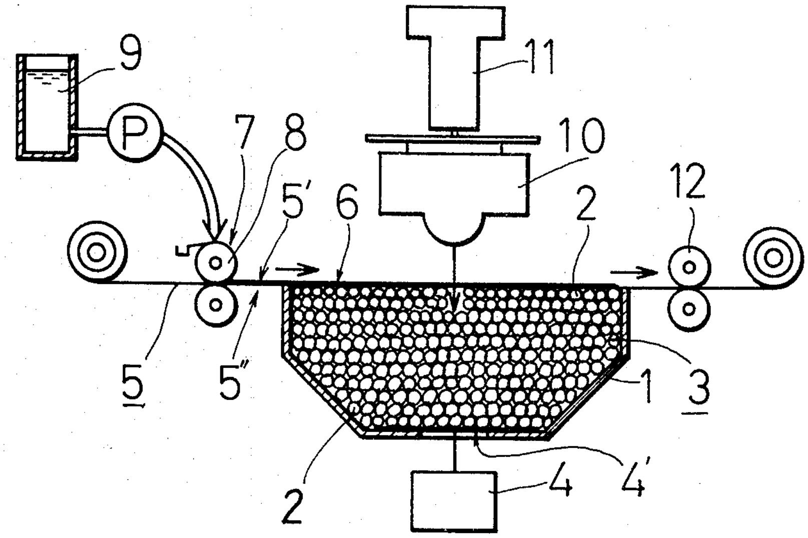
FIGS. 1 to 3 are respectively a cross sectional side view illustrating an embodiment of a printing tub to be employed in the present invention.

Referring to FIG. 1, there is shown the printing tub 1 which is filled with a number of fine granules such as, for example, steel balls 2 which form the accumulated granule layer.

Steel balls used, for example, in miniature bearings can be directly used as said balls 2, or the balls 2 can be otherwise made of synthetic resin material.

Said printing tub 1 is provided with a vibrating means such as, for example, ultrasonic oscillator 4 and a vibratory film 4' which is vibrated by said vibrating means, which gives vibratory waves to the accumulated granule layer 3.

The transcription film 5 made of an extendible film is supplied to said printing tub 1. The transcription pattern 6 such as, for example, wood grain pattern or cloud pattern is preprinted on the transcription film 5 to form the transcription surface 5'.

This transcription film 5 is supplied to keep its rear surface 5'', opposite the transcription surface 5', in contact with the accumulated granule layer 3, and is kept stationary on the accumulated granule layer 3. Said transcription film 5 can be cut in advance in a specified size but, in case of the embodiment shown in FIG. 1, it is supplied from a roll of film.

The transcription pattern 6 is formed on said transcription film 5 and can be printed by printing means provided in the vicinity of the printing tub 1 as shown in FIG. 1 or printed at a different place. As shown in the embodiment, however, if the transcription pattern is printed on the transcription film 5 shortly before the printing tub 1, the transcription film is fed into the printing tub 1 while the transcription pattern 6 is not yet dried and therefore this printing method is advantageous in the transcription effect.

If the transcription pattern is printed at a separate place, it can be printed in multiple colors, and also, a solvent for dissolving the dried ink should be sprayed or applied onto the ink to activate the transcription pattern 6 just prior to transcription.

Printing means 7 contains the printing roller 8 and the ink supply tank 9 and the transcription film 5 is printed by the printing roller 8 as in case of the conventional printing apparatus.

An elevating means 11 for elevating the material 10 to be printed is provided just above said printing tub 1 to hold the material 10 to be printed, and impress it onto the transcription surface 5' of the transcription film 5 and subsequently depress it against the accumulated granule layer 3. The material 10 to be printed is lifted by the elevating means 11 after transcription and separated from the accumulated granule layer 3.

This elevating means 11 and the printing tub 1 can contact and part from each other at relative positions; accordingly, the elevating means 11 can be fixed and the printing tub 1 can be elevated or both the elevating means 11 and the printing tub 1 can be moved to contact and part from each other. Moreover, the elevating means 11 and the printing tub 1 can be relatively alternated, for example, it is convenient for mass printing to provide the elevating means 11 on a trolley conveyor to convey the material 10 to a recovery means after transcription.

Said transcription film 5 can be made of a material which is extendible at the time of transcription; for example, an elastic film or an expandable film such as a thin rubber strip or a thermally softening film, or a film which is softened by a solvent can be used.

In case the transcription film 5 is made of an elastic film, cleaner 12 is provided following the printing tub 1 to clean the transcription surface 5' and the transcription film 5 can be wound up by a winding means after cleaning.

Figure 2:
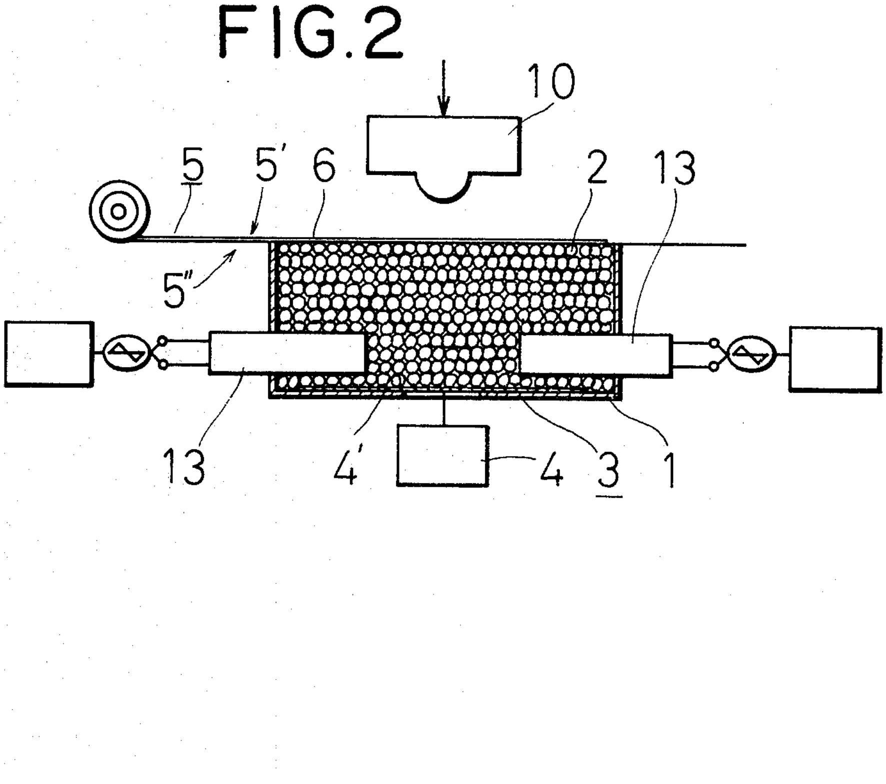

In case the transcription film 5 is made of a thermofusible film, the transcription film 5 can be given an extendibility by heating the accumulated granule layer 3 in the printing tub 1 with heater 13 as shown in FIG. 2.

Figure 3:
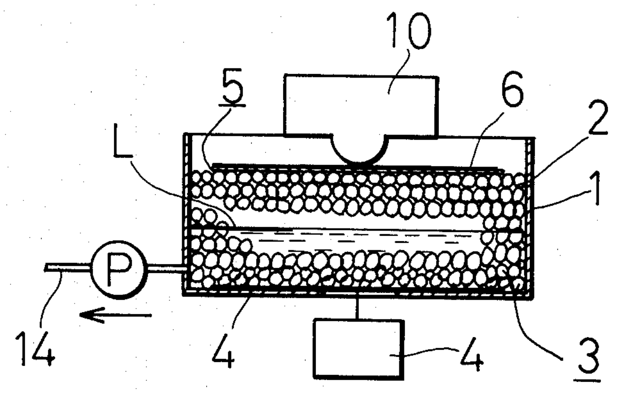

In case the transcription film 5 is an expandable film made of, for example, polyvinyl alcohol or methyl cellulose, water supply and discharge system 14 as shown in FIG. 3 can be provided as a means for expanding the transcription film 5, in which pump P is adapted to raise the water level L in the printing tub 1 to make the transcription film 5 absorb water when the transcription film 5 is extended over the accumulated granule layer 3, and lower the water level to prevent spontaneous extension of the transcription film 5 after expansion of the transcription film 5.

In case said transcription film 5 can be made extendible with a solvent or is made of a film using butyl rubber or vinyl acetate, the solvent can be sprayed onto the transcription film 5 which is extended over the accumulated granule layer 3.

Said transcription film 5 is removed in most cases from the material 10 after transcription by using an exfoliating or dissolving means.

The transcription pattern 6 can be adhered to the material 10 to be printed to transcribe the transcription pattern 6 from the transcription film 5 to the material 10. Transcription can be made by means of an impression force or the impression force and another method, for example, so-called hot stamping method for heating the transcription pattern 6.

The material 10 can be printed through the following processes when the printing tub 1 shown in FIG. 3 in used.

Figure 4A:
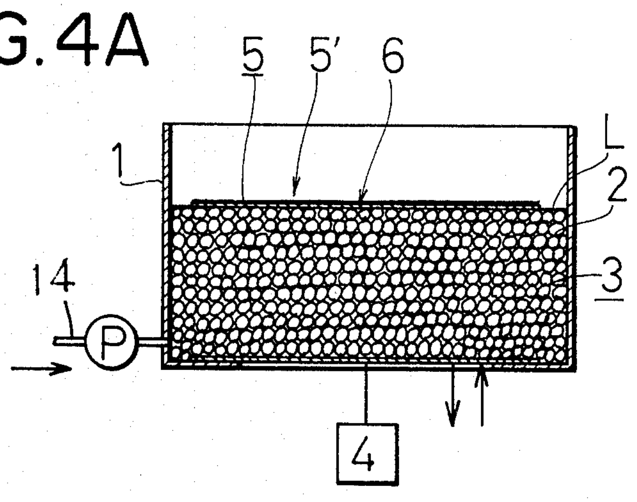
FIGS. 4*a* to 4*c* are respectively a rough illustration showing the steps of the process according to the present invention.

The transcription film 5 stored in the printing tub 1 is expanded and soaked with water in which the accumulated granule layer 3 is immersed as shown in FIG. 4A, to give it extendibility.

Figure 4B:
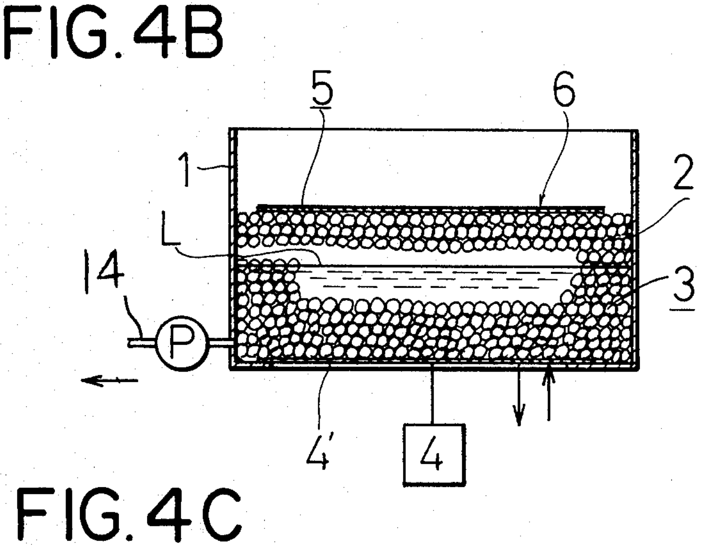

If the water level L is lowered by the water supply and discharge system 14 as shown in FIG. 4B, the transcription film 5 is kept stationary without spontaneous extension.

Figure 4C:
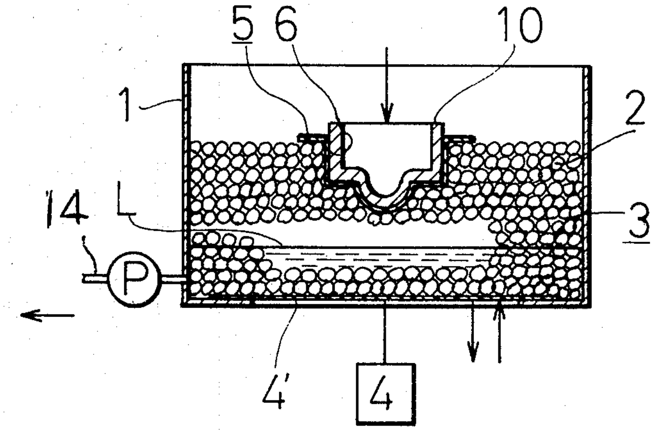

As shown in FIG. 4C, when the material 10 to be printed is lowered into the printing tub 1 under this condition to contact the transcription film 5, and is depressed down while a vibration is applied to the accumulated granule layer 3, the spherical granules 2 forming the accumulated granule layer 3 move to rub the surface of the material 10 to be printed, through the film 5, thus permitting the material 10 to be submerged into the accumulated granule layer 3.

In this case, the transcription film 5 between the material 10 to be printed and the accumulated granule layer 3 is impressed against the surface of the material 10 by the granules 2 of the accumulated granule layer 3 and receives the weight in the direction of recovery of the accumulated granule layer 3 and can be closely adhered to the surface of the material 10 to be printed while being extended over the surface of the material 10, whereby the transcription pattern 6 is transcribed onto the material 10.

Accordingly, when the transcription film 5 is removed from the material 10, the transcription pattern 6 remains on the surface of the material 10 and therefore the printing can be satisfactorily carried out even on a curved surface of the material 10.

The vibrating means 4 need not always be provided at the accumulated granule layer 3 side. Depending on the particular case, the vibrating means can be provided only at the side of the material 10 to be printed or both at the accumulated granule layer said and at the material 10 side.

In the above processes, a top coating will be required in some cases after the transcription pattern 6 has been printed on the material 10 since the transcription film 5 is removed after printing.

The method shown in the second embodiment is effective in the above case.

Figure 5A:
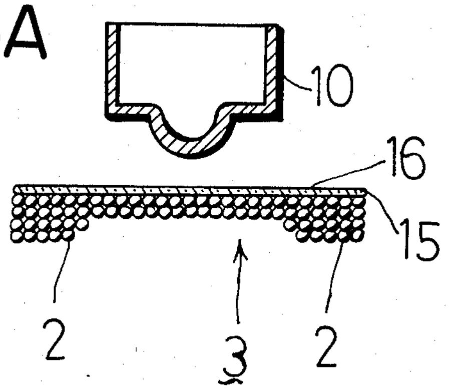
FIGS. 5*a* and 5*b* are respectively a rough illustration showing other processes of the present invention.
Figure 5B:
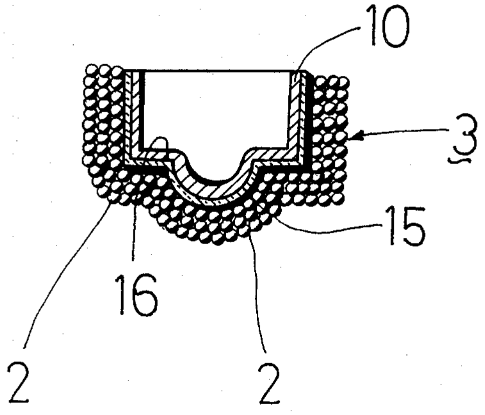

This second apparatus utilizes the embodiment shown in FIG. 2, and is characterized by using an extendible film made of thermo-fusible resin shown in FIG. 5A as the covering film 15 on which a printing pattern 16 is provided at one of its front and rear surfaces, extending this covering film 15 in the printing tub 1 shown in FIG. 2, raising the temperature of the accumulated granule layer 3 of the printing tub 1, for which granules 2 with excellent heat conductivity are used, up to the dissolving temperature of the covering film 15, and impressing the material 10 to be printed onto the covering film 15 and immersing the material 10 into the accumulated granule layer 3 while said layer 3 is being vibrated. The covering film 15 is made to closely contact the surface of the material 10 to be printed by the vibrating granules 2 as shown in FIG. 5B, and is heated by the granules 2 so as to be adhered to the material 10 to be printed.

According to the present invention, a desired outer surface can be obtained by selecting the material of the covering film 15 since the surface of the material 10 to be printed can be covered with the covering film 15. Moreover, if the covering film 15 is made of a transparent material as shown in FIG. 5A, the covering film 15 can be used as the top coat by providing the printing pattern 16 on the internal surface, that is, the surface which contacts the material 10 to be printed, of the covering film 15.

The heating means for the accumulated granule layer 3 need not be the heater 13; an ultrasonic vibrator can be employed as the vibrating means 4, and can generate heat from its vibratory wave.

In this case, an advantage is that the heating means need not be provided. Said heating means can be means to heat the material 10 to be printed. In this case, the effect of adhesion is improved since the temperature at the surface of the material 10 to be printed is increased.

The heating to raise the temperature of said accumulated granule layer 3 and the material 10 to be printed can be carried out while the material 10 is being depressed into the accumulated granule layer 3 or after the former has been depressed into the latter. However, since it is suitable to raise the temperature of the accumulated granule layer 3 at all times, it is actually carried out in general to raise the external surface temperature while the material 10 to be printed is kept depressed against the accumulated granule layer 3 for a specified period of time.

In case of said second embodiment, the covering film 15 is thermally fused to adhere to the material 10 to be printed. In this case, the temperature should be relatively high because the fusion of the covering film 15 is a requirement.

The third embodiment is intended to eliminate such disadvantage. This embodiment is also intended to adhere the covering film 15 to the material 10 to be printed with an adhesive layer 15' formed on the internal surface of the covering film 15 as shown in FIG. 6A and FIG. 6B or on the surface of the material 10 to be printed.

The adhesive layer 15' of said covering film 15 can be made as a thermo-fusible type or a pressure sensitive type. In case of a thermo-fusible type, it is desirable to select a kind of material which is adhered at a temperature lower than the fusing temperature of the covering film 15.

The thermo-fusible or pressure sensitive type adhesive layer can be selected for said material 10 to be printed.

Figure 6A:
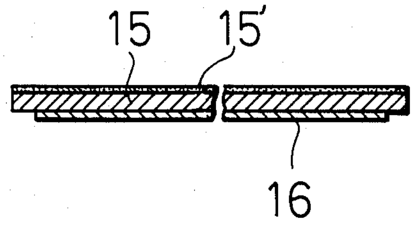
FIGS. 6*a* and 6*b* are respectively a cross sectional view illustrating an embodiment of the covering film to be employed in the method according to the present invention.
Figure 6B:
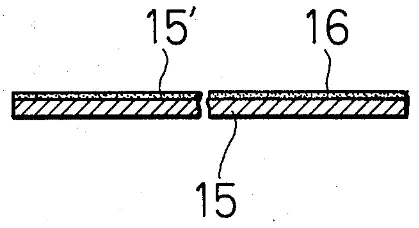
Figure 7:
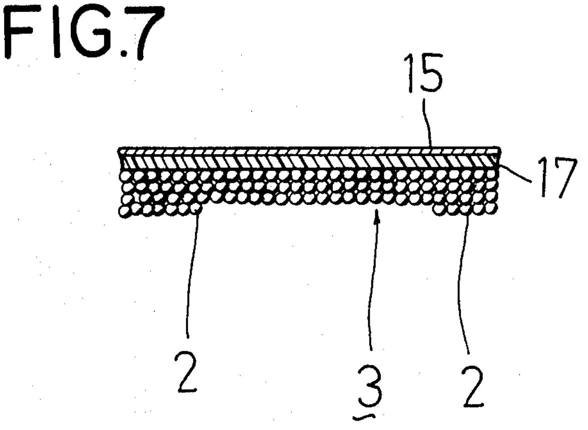
FIG. 7 is a rough illustration showing another embodiment of the present invention.

The adhesive layer 15' of said covering film 15 is formed by applying an adhesive agent to the covering film 15 as shown in FIG. 6A. In case the covering film 15 is transparent and the printing pattern 16 is printed entirely on the film surface which comes in contact with the material 10 to be printed, the printing pattern 16 can be printed with an adhesive type ink such as a thermally-soluble ink to form the adhesive layer as shown in FIG. 6B.

According to the third embodiment, the covering film 15 can be made of a material other than the thermo-fusible material and it can be advantageously adhered to the material 10 to be printed without excessively fusing the covering film 15 even if the covering film 15 is made of a thermo-fusible material.

A sheet layer 17 made of a plastically deformable material such as silicon rubber can be interposed between said transcription film 5 or the covering film 15 and the accumulated granule layer 3 in the printing tub 1. Thus the pressure of the accumulated granule layer 3 against the films 5 and 15 is uniformly distributed and the films 5 and 15 can be protected against damage due to the balls 2 since they do not directly contact the balls 2.

What is claimed is:

1. A method of printing which comprises:

positioning a transcription film, made of an extendible film on which a transcription pattern is preprinted to form a transcription surface, on an accumulated granule layer consisting of a plurality of granules, said transcription film being positioned on said accumulated granule layer so that the surface of said transcription film opposite said transcription surface contacts said accumulated granule layer, contacting a material to be printed against said transcription surface of said transcription film, impressing said material to be printed in contact with said transcription film into said accumulated granule layer, vibrating at least one of said accumulated granule layer and said material to be printed while said material to be printed is impressed into said accumulated granule layer, and transcribing said transcription pattern onto said material to be printed by conducting the internal pressure of said accumulated granule layer to the transcription film.

2. A method of printing in accordance with claim 1, wherein said transcription film is made of an elastic film.

3. A method of printing in accordance with claim 1, wherein said transcription film is made of an expandable film which is expanded before said transcription film comes in contact with said material to be printed.

4. A method of printing in accordance with claim 1, wherein said transcription film is made of a material which is extendible with a solvent.

5. A method of printing in accordance with claim 1, wherein said transcription film is made of a material which is extendible with heat.

6. A method of printing in accordance with claim 1, wherein an ultrasonic vibrator is employed as a means for said vibrating.

7. A method of printing which comprises:

positioning a covering film, made of a thermally-fusible extendible film on which a printing pattern is preprinted, on an accumulated granule layer consisting of a plurality of granules, contacting a material to be printed against said covering film, impressing said material to be printed in contact with said covering film into said accumulated granule layer, vibrating at least one of said accumulated granule layer and said material to be printed while said material to be printed in impressed into said accumulated granule layer, and heating at least one of said accumulated granule layer and said material to be printed so that said covering film is thermally fused and adhered to said material to be printed.

8. A method of printing in accordance with claim 7, wherein said covering film is made of a transparent material and said printing pattern is printed on a surface of said covering film which comes in contact with said material to be printed.

9. A method of printing in accordance with claim 7, wherein an ultrasonic vibrator is employed as a means to vibrate said accumulated granule layer.

10. A method of printing in accordance with claim 7, wherein said accumulated granule layer is heated to raise its temperature and said material to be printed is heated in said accumulated granule layer.

11. A method of printing which comprises:

positioning a covering film, made of an extendible film on which a printing pattern is preprinted, on an accumulated granule layer consisting of a plurality of granules, contacting a material to be printed against said covering film, impressing said material to be printed in contact with said covering film into said accumulated granule layer, and vibrating at least one of said accumulated granule layer and said material to be printed while said material to be printed is impressed into said accumulated granule layer, an adhesive layer being interposed between said covering film and said material to be printed to adhere said covering film to said material to be printed.

12. A method of printing in accordance with claim 11, wherein said adhesive layer is formed on the surface of said covering film which contacts said material to be printed.

13. A method of printing in accordance with claim 11, wherein said covering film is made of a transparent material and said adhesive layer is formed by said printing pattern on said covering film.

14. A method of printing in accordance with claim 11, wherein said adhesive layer is formed on the surface of said material to be printed.

15. A method of printing in accordance with claim 11, wherein said accumulated granule layer is vibrated by an ultrasonic vibrator.

16. A method of printing which comprises:

positioning a sheet layer made of a plastically deformable material on an accumulated granule layer consisting of a plurality of granules, positioning an extendible film, on which a printing pattern is preprinted, on said sheet layer, contacting a material to be printed against said extendible film, impressing said material to be printed in contact with said extendible film, and said sheet layer, into said accumulated granule layer, and vibrating at least one of said material to be printed and said accumulated granule layer, whereby pressure is exerted by said accumulated granule layer and is uniformly distributed on said extendible film through said sheet layer.

* * * * *